United States Patent

[11] 3,564,189

[72] Inventor Ellsworth E. Rhodes
Bangor Township, Bay County, Mich.
[21] Appl. No. 765,154
[22] Filed Oct. 4, 1968
[45] Patented Feb. 16, 1971
[73] Assignee By mesne assignments to Newcor, Inc.
Bay City, Mich.

[54] STRESS RELIEVING FEATURE ON STRIP WELDERS
11 Claims, 3 Drawing Figs.
[52] U.S. Cl. ..................................................... 219/83, 219/59, 219/67
[51] Int. Cl. ..................................................... B23k 11/06, B23k 31/06
[50] Field of Search ........................................... 219/83, 67, 59

Primary Examiner—J. V. Truhe
Assistant Examiner—Hugh D. Jaeger
Attorney—Woodhams, Blanchard and Flynn ABSTRACT: A method of seam welding wherein, first, portions of work parts are contacted by roller-welding electrodes which make a first pass to form a welded joint and, subsequently, roller electrodes, normally the welding electrodes, make a second pass over the welded joint at a controlled rate and at a reduced heat in order to heat the welded joint to within a predetermined temperature range below fusion temperature to stress relieve the welded joint prior to, or after, planishing thereof.

PATENTED FEB 16 1971 3,564,189

INVENTOR.
ELLSWORTH E. RHODES
BY
Woodhams, Blanchard & Flynn
ATTORNEYS

STRESS RELIEVING FEATURE ON STRIP WELDERS

FIELD OF THE INVENTION

This invention relates to a welding process and, more particularly, relates to a process of seam welding in which the welded joint is stress relieved prior to planishing or other subsequent treatment thereof.

BACKGROUND OF THE INVENTION

In the known processes of seam welding, such as in strip welders of the type disclosed in copending application Ser. No. 553,971, filed May 31, 1966, now U.S. Pat. No. 3,511,961, and assigned to the same assignee as the present invention, the welded joint formed is often brittle, particularly when the work parts are made of medium carbon and low alloy steels. As the strip, including the welded joint, is moved from the weld zone over rolls to other pats of the machine, a bending of the welded joint occurs. This may cause the brittle welded joint to become fatigued and may lead to eventual cracking thereof. Moreover, a brittle welded joint more strongly resists the subsequent planishing treatment in which the welded joint is cold rolled in order to reduce the thickness thereof to as close as possible to the parent metal thickness and to cold work the joint to as close to the parent metal strength as possible.

Various attempts have been made in the past to anneal the welded joint to relieve the stresses formed therein by welding. In some cases, the welded joint has been heat treated by means of gas-burning flames, by induction heating, or by other processes whereby the welded joint is heated to a predetermined temperature to relieve the stresses formed in the welded joint. However, these prior types of procedures for stress relieving the welding joint require additional, expensive equipment, they are expensive to carry out an it is difficult to accurately control the temperature to which the work parts are heated to effect satisfactory annealing of the welded joint.

Accordingly, it is an object of this invention to provide a process for removing or relieving the stresses in a welded joint to improve the ductility of the welded joint by contacting the welded joint with welding electrodes a second time and thereby supplying sufficient heat to the welded joint to effect a stress relieving thereof, but without effecting a second fusion.

It is a further object of this invention to provide a process, as aforesaid in which the welded joint is stress relieved after the weld has been performed and prior to planishing of the weld joint so that the planishing operation can be carried out effectively in order to reduce the thickness of the welded joint to as ls as possible to the thickness of a single one of the individual work parts and to cold work the weld joint to increase the strength of the joint to as close to the metal strength work parts as possible.

It is a further object of this invention to provide a process, as aforesaid, in which the ductility of the weld joint is improved so that the welded joint can be moved from the weld zone to other parts of the machine over rollers without fatiguing and eventually cracking.

It is a further object of the invention to provide a process, as aforesaid, which can be easily further extended without the need for additional equipment to effect a stress-relieving procedure after the planishing operation if desired.

It is a further object of this invention to apparent a method which can be easily carried out this general type upon reading the seam welding machines.

Other objects and purposes of this invention will be apparent to persons acquainted with seam welding apparatus of this general type upon reading the following specification and inspecting the accompanying drawings, in which.

Figure 1:
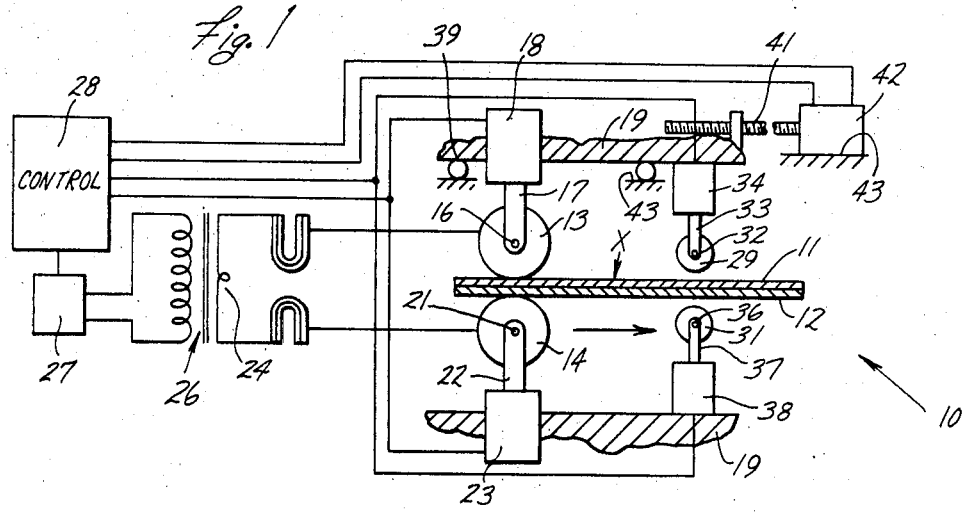
FIG. 1 is a schematic illustration of a seam welding apparatus for carrying out the method of the invention.

Certain terminology will be used in the following descriptive material for convenience in reference only and will not be limiting. The words "up," "down," "right" and "left" will designate directions in the drawing to which reference is made. The words "in" and "out" will refer to directions toward and away from respectively, the geometric center of the device and designated parts thereof. Said terminology will include the words above specifically mentioned, derivatives thereof and words of similar import.

SUMMARY OF THE INVENTION

The objects and purposes of the invention are met by providing a method in which after the welding operation, a pair of electrodes are moved along the welded joint under controlled conditions whereby the work parts are again heated to within a predetermined temperature range below the welding or fusion temperature in order to relieve stresses in the weld joint, the same being done prior to planishing thereof, after planishing or both. While the broadest concept of the invention could include the passing of two sets of electrodes over the work parts, one set performing a welding operation and the second set performing a stress-relieving operation, this is undesirable for several reasons including expense of equipment required. Accordingly, the primary concept is to pass the same set of electrodes twice over the work parts, the first time performing a welding operation and the second time performing a stress-relieving operation.

DETAILED DESCRIPTION

While the invention lies mainly in the method for stress-relieving a welded joint, it is believed that the method will be more conveniently and readily understood by describing it in conjunction with an apparatus 10 by which it can be carried out. It is to be understood that the apparatus described hereinbelow for practicing the method is illustrative only and is not intended to be limiting.

Figure 2:
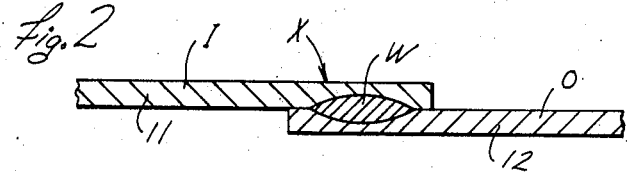
FIG. 2 is a cross section of the work parts which have been joined together by welding prior to planishing thereof.

Referring now to FIG. 1, a pair of work parts 11 and 12 are overlapped to define an elongated zone in which a seam weld is to be formed. The work parts 11 and 12 may be, for example, the head end of an incoming strip I (FIG. 2) and the tail end of an outgoing strip 0 and the apparatus 10 may be a strip end welding machine having a structure similar to that disclosed in the aforesaid copending application Ser. No. 553,971, filed May 31, 1966. The work parts move in a direction perpendicular to the plane of the paper in FIG. 1.

Vertically aligned welding roller electrodes 13 and 14 are positioned so as to engage opposite sides of the elongated weld zone X on the work parts 11 and 12. In the particular embodiment shown, the upper welding roll 13 is rotatably supported shaft 16 which is secured to a vertically reciprocable rod 17 energized by a fluid pressure cylinder 18 secured to a movable carriage 19. The lower welding roller 14 is rotatably supported on a shaft 21 which in this embodiment is secured to a vertically reciprocable rod 22 energized by a pressure fluid cylinder 23 secured to another part of the carriage 19. In many instances, however, the mounting of one of the welding rollers 13 and 14 is fixed with only the other being reciprocable. The carriage 19 is movable in a direction transverse to the direction of travel of the work parts 11 and 12 and lengthwise along the weld zone X.

The roller electrodes 13 and 14 are connected in any convenient manner to the opposite terminals of a secondary winding 24 of a welding transformer 26. The welding transformer is supplied in any convenient and conventional manner from a source of electrical energy 27 controlled by a control 28. The pressure fluid cylinders 18 and 23 are energized in a predetermined and adjustable pattern by the control 28 to thereby provide a controlled pressure by which the roller electrodes 13 and 14 are urged against the work parts 11 and 12, and respectively.

Vertically aligned planishing rollers 29 and 31 engage opposite sides of the weld zone X and they are disposed in aligned relationship to the welding electrodes 13 and 14. In the particular embodiment shown, the upper planishing roller 29 is rotatably supported on a shaft 32 secured to a vertically reciprocable rod 33 of a pressure fluid cylinder 34, said cylinder being energized by the control 28 for controlled vertical movement and pressure. The fluid pressure cylinder 34 is secured to the carriage 19. The lower planishing roller 31 is rotatably supported on a shaft 36 secured in this embodiment to a vertically reciprocable rod 37 of a fluid pressure cylinder 38, which latter is secured to the carriage 19. The fluid pressure cylinder 38 is also energized by the control 28 so that the planishing roller 31 can be moved vertically and the pressure exerted thereby on the weld zone X can be controlled. However, as with the welding roller, in many instances the mounting for one of the planishing rollers 29 or 31 is fixed and only the other is reciprocable.

The carriage 19 is supported for movement by any convenient means such as rollers, one of which is indicated by 39 in FIG. 1. The carriage 19 is secured to any means for effecting reciprocation thereof, in this embodiment a screw 41 driven by motor 42, said motor being secured to a stationary frame 43. The motor 42 is energized by the control 28 to move the carriage 19 in the desired sequence. It is recognized, of course, that the control 28 can be of the manual variety but in the preferred embodiment, the control 28 can be programmed so that the energization of the cylinders 18, 23, 34 and 37 and the motor 42 will occur automatically and is a synchronized pattern as hereinafter described.

OPERATION

The method of the invention will be described with reference to the operation of the apparatus. At the start, the carriage 19 and thereby the roller electrodes 13 and 14 will be in a position adjacent the left edge of the work parts 11 and 12 and said electrodes will be vertically spaced from the work parts. After the work parts are overlapped, the control 28 will then energize the fluid pressure cylinders 18 and 23, assuming both are used, to cause a movement of the roller electrodes 13 and 14 into contact with the work parts 11 and 12, respectively. The pressure applied to the roller electrodes 13 and 14 will be sufficient to cause the work parts 11 and 12 to be urged tightly together so that a completed electrical circuit will exist between the roller electrodes 13 and 14 through the clamped work parts 11 and 12. Simultaneously therewith, the control 28 will cause the source 27 to energize the welding transformer 26 to supply welding current through the electrodes 13 and 14 and the work parts 11 and 12 whereby a weld or fusion (FIG. 2) will be produced in the usual manner by the heat obtained from the resistance to the flow of electric current through the work parts held together under pressure by the roller electrodes 13 and 14. Simultaneously, the control 28 will energize the motor 42 to cause a rightward movement the carriage 19 and electrodes 13 and 14 as appearing in FIG. 1. As a result, the electrodes 13 and 14 will roll on the work parts 11 and 12, respectively, along the elongated weld zone X to produce an elongated weld seam W. It will be noted that the planishing rollers 29 and 31 are held away from the work parts 11 and 12 during the rightward movement of carriage 19.

When the carriage 19 has reached its rightwardmost limit, the motor 42 is stopped and the welding electrodes 13 and 14 will in this embodiment be positioned adjacent the right edge of the work parts 11 and 12 as appearing in FIG. 1. At this time the control 28 will modify the source 27 to diminish the flow of welding current. The control 28 will then reenergize the motor 42 in a reverse direction to cause a leftward movement of the carriage 19 and welding electrodes 13 and 14. The pressure supplied to the fluid pressure cylinders 18 and 23 can, in this particular embodiment, be maintained constant so that the electrodes 13 and 14 will be always urged against the work parts 11 and 12 with a constant pressure. However, a lesser pressure can be used, if desired. In the meantime, the control 28 now maintains the flow of current between the electrodes 13 and 14 at a diminished value such that it will not be sufficient to produce a welding heat or a second fusion of the weld seam. Rather the current should now be sufficient only to heat the welded joint W to stress-relieving temperature, which for most steels is ordinarily in the range of 800° to 1200° F. Thus the heat produced will stress relieve welded joint W to eliminate or reduce the stresses therein and increase the ductility of the weld joint W. It will be recognized that, during the leftward movement of the carriage 19, the speed of movement of said carriage can be increased by the control 28 and this can be used in lieu of, or in combination with, the reduction of the current output of transformer 26 to insure that the heat supplied to the weld zone will be sufficient only for stress relieving the weld zone and not for causing a second fusion.

Alternatively, the welding current may be terminated when the carriage has completed a welding stroke and the current flow resumed at a stress-relieving level when the carriage reverses. In either case, the fluid pressure cylinders are deenergized and the electrodes retracted in the usual manner when said electrodes move off the work at the end of their annealing stroke, leftward as appearing in the drawing.

Figure 3:
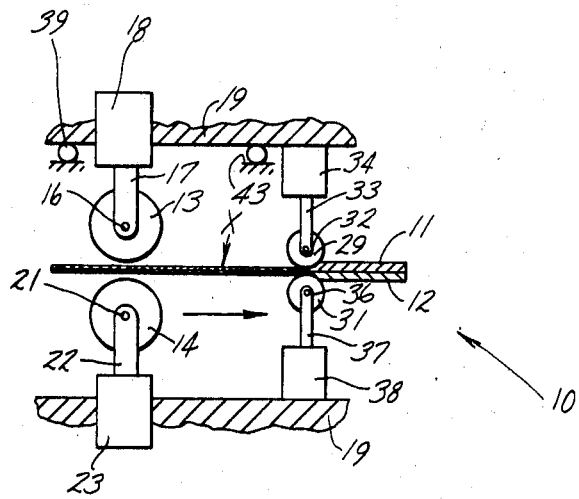
FIG. 3 is a schematic illustration similar to a fragment of FIG. 1 showing the welding electrodes making a second pass over the work parts followed by the planishing rollers also engaging the work parts.

At the completion of the stress-relieving stroke, the motor 42 is stopped to locate the planishing rolls over the left edge of the work parts 11 and 12. The control 28 will then energize the fluid pressure cylinders 34 and 38 to position the planishing rolls 29 and 31 against the left edge of the work parts 11 and 12 to thereby compress said parts in a known manner to a thickness nearly equal to the thickness of one of the work parts 11 or 12. The carriage now moves (FIG. 3) and the planishing rollers will effectively cold roll the welded joint W to thereby cold work same to increase the metal strength thereof to a level almost equal to the metal strength of one of the work parts 11 or 12. The control 28 will continue to energize the motor 42 until the planishing rollers 29 and 31 move off the rightward edge of the work parts 11 and 12 after which time the control 28 will deenergize the cylinders 34 and 38 to retract the planishing rollers 29 and 31 in a vertical direction. The control 28 and carriage 19 may then be recycled to the start position so that the process can be repeated.

If desired, the planishing rollers 29 and 31 may be secured to a carriage member which moves independently of the carriage 19. The movement thereof can be controlled by the control 28 so that a longitudinal movement thereof across the work parts 11 and 12 will occur at a desired rate of speed independent of the rate of speed of the welding electrodes 13 and 14. Thus, the planishing process may be accurately controlled so that the resultant product will be smooth, unrippled and there will be a blend of one side of the work part with the corresponding side of the other work part.

Although the foregoing detailed discussion relates only to the preferred embodiment utilizing one set of electrodes which move over the work parts twice, under the broad concept of the invention the same operation can be performed by two sets of electrodes, each of which makes one pass over the work parts, first to weld a joint and second to stress relieve the welded joint.

Although the invention has been described with reference to a process which includes planishing the weld joint, the invention can also be used to advantage in welding processes which do not include a planishing step. Conversely, if it is desired to effect a stress relieving of the joint after the planishing step, regardless of whether or not such was done before planishing, same can be easily done merely by running the welding electrodes at a low heat again over the weld zone.

While the particular method above described deals with the stress relieving of a lapped seam weld, it will be understood that the broader concept of the invention will be also applicable to a butt joint which may be either arc or resistance welded. In such case, a planishing step will be normally required prior to stress relieving in order to present a sufficiently smooth surface to effect good contact by the stress-relieving electrodes.

Although a particular preferred embodiment of the invention has been disclosed above for illustrative purposes, it will be understood that variations or modifications thereof which lie within the scope of the appended claims are fully contemplated.

I claim:

1. A method of seam welding, comprising the steps:

placing work parts which are to be welded together between welding electrodes;

bringing the welding electrodes into engagement with the work parts and supplying welding energy thereto, simultaneously moving the welding electrodes and the work parts relative to each other to produce fusion therebetween to thereby produce a welded joint;

thereafter moving electrodes over said welded joint and simultaneously supplying a stress-relieving energy to the electrodes to increase the ductility of the welded joint by relieving the stresses therein; and simultaneously with the foregoing controlling the first and second electrode movements so that the second movement will be faster than the first movement to limit the heat supplied to the welded zone by the stress-relieving energy applied to the electrodes to a level which is sufficient to stress relieve the welded zone but insufficient for causing a second fusion.

2. The method of claim 1, including the step of planishing the welded and stressed-relieved joint to cold work same to a thickness equal to the thickness of at least one of the work parts to increase the strength of the welded joint and to produce a welded joint having a desirable ductility.

3. The method defined in claim 1, including the step of controlling the stress-relief energy to heat the welded joint to a temperature in the range of 800° to 1200° F.

4. The method defined in claim 1, including the step of precisely controlling the rate of the second movement so that the stress-relieving energy will heat the welded joint to a temperature in the range of 800° to 1200° F.

5. The method defined in claim 1, in which the welding electrodes and the stress-relieving electrodes are the same electrodes.

6. The method defined in claim 5, in which the current which flows between said electrodes during the stress-relieving step is less than the current which flows between the electrodes during the welding step.

7. The process of claim 1, in which the work parts are lap welded.

8. The process of claim 1, in which the work parts are butt welded.

9. A method of seam welding, comprising the steps:

placing work parts which are to be welded together between welding electrodes;

bringing the welding electrodes into engagement with the work parts and supplying welding energy thereto, simultaneously moving the welding electrodes and the work parts relative to each other to produce fusion therebetween to thereby define a welded joint;

thereafter moving electrodes over said welded joint and simultaneously supplying a stress-relieving energy to the electrodes to increase the ductility of the welded joint by relieving the stresses therein; and planishing the welded and stress-relieved joint to cold work same to a thickness equal to the thickness of at least one of the work parts to increase the strength of the welded joint and to produce a welded joint having a desirable ductility.

10. The method of claim 9, in which the planishing step follows the stress-relieving step.

11. The method of claim 9, in which the planishing step precedes the stress-relieving step.